April 7, 1942.  G. H. BROWN ET AL  2,278,686
RADIO FREQUENCY WATTMETER
Filed Jan. 2, 1940
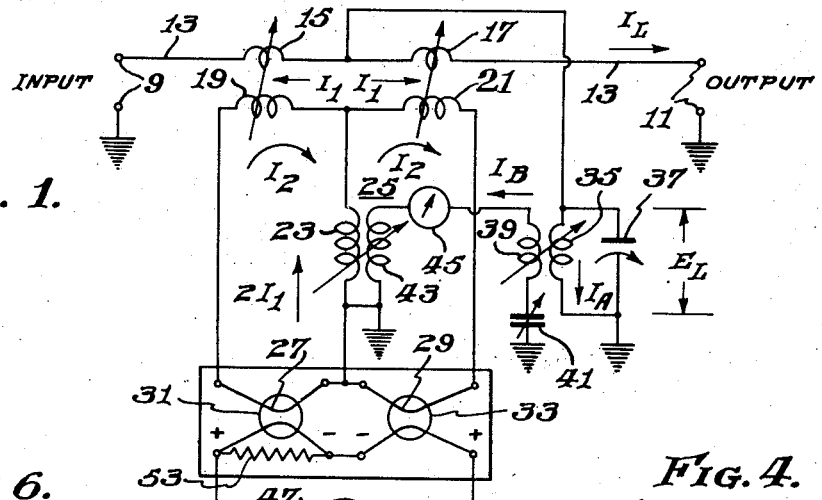
FIG. 1.
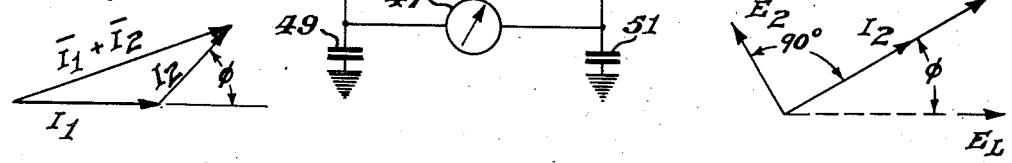
FIG. 6.  FIG. 4.
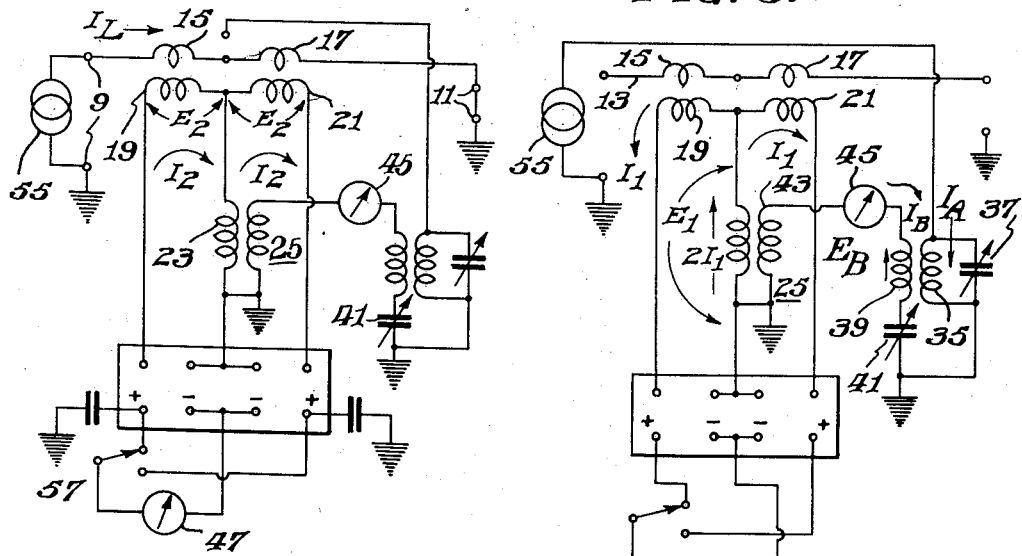
FIG. 2.  FIG. 3.
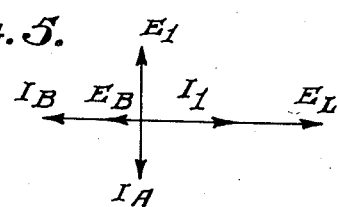
FIG. 5.
Inventors
George H. Brown
Jess Epstein
Attorney Patented Apr. 7, 1942

2,278,686

UNITED STATES PATENT OFFICE 2,278,686

RADIO FREQUENCY WATTMETER

George H. Brown, Haddonfield, and Jess Epstein, Westmont, N. J., assignors to Radio Corporation of America, a corporation of Delaware Application January 2, 1940, Serial No. 312,058

6 Claims. (Cl. 171—95)

This invention relates to electrical power measuring devices, and particularly to a radio frequency wattmeter.

Meters for measuring electrical energy at commercial power frequencies are well known. The commercial wattmeter, however, is not suitable for the measurement of radio frequency power. It is, therefore, the principal object of our invention to provide a radio frequency wattmeter.

One essential characteristic of a radio frequency wattmeter is that it produce a negligible effect on the circuit to which it is connected. Where a given radio transmitter, for example, is connected by a plurality of transmission lines to a number of radiators comprising a directive antenna array, it is desirable to be able to insert a wattmeter in the transmission lines successively without detuning or otherwise affecting the system. It is therefore, a further object of our invention to provide a radio frequency wattmeter having a negligible series impedance and a high shunt impedance so that it may be inserted in and removed from a radio circuit whenever necessary.

Other desirable features which are provided by the wattmeter of our present invention are: that it is direct reading; that it utilizes a direct current indicator which may be located at a considerable distance from the meter itself; that it may be readily calibrated without reference to another radio frequency meter; that its calibration is independent of frequency; that it operates without appreciable error with a current having a substantial leading or a lagging power factor; that it is conveniently adapted for use over a wide range of frequencies, which range may easily be extended by changing several coils; that it is extremely economical to build; that no external power supply is required as it uses no vacuum tubes; and that it consumes a minimum of power from the line.

This invention will be better understood from the following description when considered in connection with the accompanying drawing, in which Figure 1 is a schematic diagram of our invention; Figures 2 and 3 are schematic diagrams illustrating the method of calibrating the meter; and Figures 4, 5 and 6 are vector diagrams for explaining the operation and calibration of the meter. Similar reference numerals refer to similar parts throughout the several drawings.

Referring to Fig. 1, the wattmeter is provided with input terminals 9 and output terminals 11. One input and one output terminal is shown grounded, but it is to be understood that this is not necessarily actual ground, but may be the ground of the system. By means of these terminals the meter is inserted in the transmission line supplying power to a load. A conductor 13 is connected between the ungrounded input and output terminals. The conductor is preferably a copper tube or other low resistance conductor, and is bent so as to form two suitably spaced single turn line current coils 15 and 17 through which the entire line current flows. The reactance of these coils is negligible at the operating frequency, and the series resistance of the conductor is also negligible, so that the power loss in the meter is likewise negligible.

A pair of current pick-up coils 19 and 21 are connected in series and adjustably coupled to the two line current coils 15 and 17, respectively. We have found that the size of the current pick-up coils is not critical and may be, for example, approximately 10 turns. The inner terminals of the two current pick-up coils are connected through the secondary 23 of a voltage transformer 25 to ground. The outer terminals of the two current pick-up coils 19, 21 are connected through the heater elements 27, 29 of a pair of current responsive vacuum thermocouples 31, 33, respectively, to ground. The circuit described so far is the line current responsive portion of the wattmeter. The line voltage responsive portion will now be described.

A connection is made from any convenient point on the conductor 13 to the high potential side of a parallel circuit comprising an inductor 35 and a variable capacitor 37, the low potential sides of which are grounded. A voltage pickup coil 39 is adjustably coupled to inductor 35. One terminal of this coil is connected to ground through a series capacitor 41 and the other terminal of the coil is connected to the high potential terminal of the primary winding 43 of the voltage transformer 25, the low potential terminal of which is grounded. This connection may include a current meter 45 for indicating the condition of resonance in the voltage coils.

The output terminals of the vacuum thermocouples are connected in series opposition, that is, the negative D. C. output terminals, are connected together and a suitable D. C. meter 47 is connected between the two positive terminals. Both terminals of the D. C. meter are preferably by-passed to ground by a pair of capacitors 49, 51. As a result, the meter deflection is proportional to the difference between the currents flowing through the two thermocouple heaters.

The adjustment and calibration of the wattmeter requires three distinct operations. First, the thermocouple unit is adjusted; second, the current coils are adjusted; and third, the voltage coils are adjusted. These adjustments will now be described.

The thermocouple adjustment and calibration is accomplished with the thermocouple unit disconnected from the remainder of the apparatus. The thermocouple heaters are connected in series to any available source of direct or alternating current, preferably of the operating radio frequency, and the output meter connected between the two positive output terminals, as described above. If the two thermocouples are exactly equal the meter reading will be zero for all values of applied current. This is not likely to be the case at first, however, and so it is necessary to adjust one or the other thermocouple until the output is reduced to zero. This is accomplished by connecting a resistor across the couple which is delivering the greatest voltage. Such a resistor, 53, is shown in Fig. 1. The unit may then be calibrated to determine its deflection constant K by energizing one of the thermocouples, the meter still being connected across the output of both couples, and determining the ratio between the energizing current and the deflection. It will also be useful to determine the meter constant $K'$ when the meter is connected to the output of only one thermocouple and that thermocouple is energized. The unit is then reconnected to the wattmeter.

The current adjustment is accomplished by disconnecting the voltage line inductor 35 from the line and passing an alternating current through the current coils as shown in Fig. 2. The output terminals 11 are short circuited, or connected to a given load, and a source of current 55, whose frequency is within the desired operating range, is connected to the input terminals 9. The amplitude of current $I_L$ flowing through the line current coils 15 and 17 is adjusted to some value which is within the desired operating range of the meter, with reference to the probable load impedance of the device whose power consumption is to be measured. For example, assume the meter is to read 1 kw. at midscale. With the output short-circuited, the line current is adjusted to that value which will flow when 1 kw. is being consumed by the assumed load. Then the coupling between the line current coils 15, 17 and the pickup coils 19, 21 is adjusted until the currents $I_2$ in the two branches of the network are each equal to a value which is determined from Equation 7, which is derived below, assuming any convenient ratio between $I_1$ and $I_2$ and unity power factor. Preferably, $I_1$ and $I_2$ are made equal. This operation is facilitated by means of a switch 57. It will be noted that when the currents $I_2$ are equalized no current flows through the secondary 23, and consequently no current is induced into the voltage circuit. As an added precaution, the current and voltage coils should be mounted at right angles to each other, or otherwise shielded.

The voltage calibration is made by applying the source 55 to the line voltage coil as shown in Fig. 3. No current flows through the conductor 13 during the voltage adjustment. The line voltage is determined for the assumed load impedance and power, and the generator 55 is adjusted to this value. A certain current will flow through inductor 35 to ground which will induce a voltage in the secondary 23 of the voltage transformer through the link circuit which includes inductors 39 and 43. The coupling between the link circuit coils is then adjusted with the meter connected to one of the thermocouples until its deflection is equal to the value previously determined from Equation 7. In using Equation 7 for the voltage and current calibrations described above, the meter constant $K'$ must be used, as the meter is connected to only one thermocouple. The same meter reading should then be obtained when the meter is connected to the other thermocouple. The path of the current $I_1$ produced by the line voltage is shown in Fig. 3. Since the current $2I_1$ divides equally between the two current paths no resultant voltage is induced in the line current inductors 15 and 17. Consequently, the meter currents produced by the line current and the line voltage are independent.

The line voltage inductor 35 is preferably tuned to resonance at the operating frequency to increase the shunt impedance of the meter, but this adjustment will not affect the calibration of the instrument. The meter is then connected as shown in Fig. 1 and it is ready for use.

The phase relation between the line current $I_L$ and the circulating current $I_2$ is illustrated in Fig. 4, to which reference is now made. The line current $I_L$ is shown leading the line voltage $E_L$ by an angle $\phi$. The voltage $E_2$ induced in the line pickup coils 19 and 21 is made to lead the line current $I_L$ by 90°, by suitably phasing the transformer secondary. The resultant current $I_2$ that flows through the branch circuits is inductive and therefore lags the voltage $E_2$ by 90°. Consequently, the induced current $I_2$ is in phase with the line current $I_L$, a condition which is required.

Referring now to Figs. 3 and 5, the phase relation between the mesh current $I_1$ and the line voltage $E_L$ will be determined. The current $I_A$ flowing through the inductor 35 lags the line voltage $E_L$ by 90°. This current $I_A$ induces a voltage $E_B$ across the pickup coil 39 and since the link circuit is tuned to series resonance by the capacitor 41, it has unity power factor and the link current $I_B$ is in phase with the induced voltage $E_B$. The induced voltage $E_1$, appearing across the secondary 23 is in quadrature with the primary current $I_B$. The mesh current $I_1$, therefore, being in quadrature with $E_1$, is in phase with the line voltage $E_L$. Consequently, it will be seen that the two mesh currents $I_1$ and $I_2$ are respectively in phase with the line voltage $E_L$ and line current $I_L$.

It now remains to be shown that the meter deflection is proportional to $E_L I_L \cos \phi$, which is the power supplied to the load. The mesh equations may be stated as follows:

$$\bar{I}_1 + \bar{I}_2 = I_1 + I_2 \cos \phi + jI_2 \sin \phi \quad (1)$$

squaring both sides:

$$(|\bar{I}_1 + \bar{I}_2|)^2 = I_1^2 + I_2^2 \cos^2 \phi + I_2^2 \sin^2 \phi + 2I_1 I_2 \cos \phi \quad (2)$$

and since $\sin^2 \phi + \cos^2 \phi = 1$ $$(|\bar{I}_1 + \bar{I}_2|)^2 = I_1^2 + I_2^2 + 2I_1 I_2 \cos \phi \quad (3)$$

and similarly for the other mesh:

$$(|\bar{I}_1 - \bar{I}_2|)^2 = I_1^2 + I_2^2 - 2I_1 I_2 \cos \phi \quad (4)$$

The meter deflection is equal to the product of the meter constant K and the thermocouple current squared. Consequently, the deflection $D_A$, due to the current in one mesh, when the meter is connected across both thermocouples, is:

$$D_A = K(|\bar{I}_1 + \bar{I}_2|)^2 = K(I_1^2 + I_2^2 + 2I_1 I_2 \cos \phi) \quad (5)$$

while the deflection $D_B$, due to the current in the other mesh, is:

$$D_B = K(|\bar{I}_1 - \bar{I}_2|)^2 = K(I_1^2 + I_2^2 - 2I_1 I_2 \cos \phi) \quad (6)$$

The total deflection, $D_T$ is equal to the difference, that is:

$$D_T = D_A - D_B = 4KI_1 I_2 \cos \phi \quad (7)$$

Equation 7 indicates that the resultant meter deflection is proportional to the product of the currents $I_1$ and $I_2$ and their phase angle $\cos \phi$. Since these currents are respectively in phase with and proportional to the line current and line voltage, the total deflection is proportional to power, as required.

It will be appreciated that the calibration of the meter is independent of frequency; the only adjustment required to shift from one frequency to another is to tune the link circuit to resonance, for which purpose the meter 45 is provided. The mesh currents are independent of frequency changes since any increase in coupling due to an increase in frequency is exactly equalized by a like increase in the mesh impedance. That is:

$$I_2 = \frac{I_L \omega M_1}{\omega L} = \frac{I_L M_1}{L} \tag{8}$$

where $M_1$ is the mutual coupling between the line current and line pickup coils, and $L$ is the mesh circuit inductance, and $$I_1 = \frac{E_L}{\omega L_A} \times \frac{\omega M_B}{R} \times \frac{\omega M_C}{\omega L_C}$$

or $$I_1 = \frac{E_L M_B M_C}{L_A R L_C} \tag{9}$$

where $M_B$ and $M_C$ are the mutual coupling of the voltage transformer and link circuit transformers; $L_A$ is the inductance of the voltage coil 35; $R$ is the resistance of the link circuit; and $L_C$ is the mesh inductance. It will be noted that the $\omega$ term cancels out of the two Equations 8 and 9.

We have thus described a radio frequency wattmeter which is accurate and reliable, which has a negligible effect on the circuit with which it is used, which is operable over a wide range of frequency, and which requires no external source of power.

We claim as our invention:

1. A radio frequency wattmeter comprising a pair of inductors, means for serially connecting said inductors in a power transmission line, said inductors being the sole impedance inserted in said line, a pair of pickup coils coupled to said inductors, respectively, a pair of current-responsive devices, connections from said devices to said pickup coils, one of said connections being common, coupling means connected in said common connection, a resonant link circuit coupled to said coupling means, and means coupling said link circuit to said transmission line.

2. A radio frequency wattmeter comprising inductance means serially connected in a power-consuming circuit, a pair of pickup coils coupled to said inductance means, a pair of serially connected current-responsive devices, connections from said devices to said pickup coils, one of said connections being common to said pair of devices, a common inductor connected in said common connection, a series resonant link circuit including a pair of coupling inductors, one of said inductors being coupled to said common inductor, means coupling the other coupling inductor to said circuit whereby currents are induced in said current-responsive devices which are respectively in phase with and proportional in amplitude to the current and voltage of said power circuit, and an indicator connected to said current-responsive devices.

3. A radio frequency wattmeter comprising inductance means serially connected in a power-consuming circuit, a pair of serially connected pickup coils coupled to said inductance means, a pair of thermocouple elements, connections from the input circuits of said elements to said pickup coils, respectively, one of said connections being common, a common inductor connected in said common connection, a series resonant link circuit including a pair of coupling inductors, one of said inductors being coupled to said common inductor, means coupling the other of said coupling inductors to said circuit whereby currents are induced in said thermocouple elements which are respectively in phase with and proportional in amplitude to the current and voltage of said power circuit, and an indicator connected across the output circuits of said thermocouples, said output circuits being connected in series bucking.

4. A radio frequency power indicating instrument comprising inductance means for connection in series with a power-consuming circuit, a pair of serially connected pickup coils coupled to said inductance means, a pair of thermocouples having their heater elements connected in series, means connecting said pickup coils and said heater elements in series, a connection including the secondary of a coupling transformer from the mid-point of said pickup coils to the mid-point of said heater elements, a second coupling transformer having a primary for connection across said power consuming circuit, and means including a capacitor connecting the secondary of said second transformer in series circuit with the primary of said coupling transformer, said series circuit being tuned to resonance at the operating frequency by said capacitor.

5. A device of the character described in claim 4 in which the primary of said second transformer is tuned to parallel resonance at the operating frequency.

6. A radio frequency power indicating instrument comprising inductance means for connection in series with a power consuming circuit, a pair of serially connected pickup coils coupled to said inductance means, a pair of thermocouples having their heater elements connected in series, means connecting said pickup coils and said heater elements in series, a connection including the secondary of a coupling transformer from the mid-point of said pickup coils to the mid-point of said heater elements, a second coupling transformer having a primary for connection across said power consuming circuit, means including a capacitor connecting the secondary of said second transformer in series circuit with the primary of said coupling transformer, said series circuit being tuned to resonance at the operating frequency by said capacitor, means connecting the output elements of said thermocouples in series opposition, and an output indicator connected across said output elements.

GEORGE H. BROWN.
JESS EPSTEIN.